United States Patent
Iasillo et al.

(10) Patent No.: US 7,950,238 B2
(45) Date of Patent: May 31, 2011

(54) METHOD FOR DETECTING ONSET OF UNCONTROLLED FUEL IN A GAS TURBINE COMBUSTOR

(75) Inventors: Robert J. Iasillo, Simpsonville, SC (US); Jason D. Fuller, Simpsonville, SC (US); William F. Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1330 days.

(21) Appl. No.: 11/586,763

(22) Filed: Oct. 26, 2006

(65) Prior Publication Data

US 2008/0098746 A1     May 1, 2008

(51) Int. Cl.
*F02C 1/00* (2006.01)
(52) U.S. Cl. .................. 60/772; 60/776; 60/39.094
(58) Field of Classification Search .................. 60/772, 60/776, 39.094, 39.463
See application file for complete search history.

(56) References Cited

U.S. PATENT DOCUMENTS

| | | | | |
|---|---|---|---|---|
| 3,344,602 A | * | 10/1967 | Davies et al. | 60/39.281 |
| 6,438,963 B1 | | 8/2002 | Traver et al. | |
| 7,322,198 B2 | * | 1/2008 | Roby et al. | 60/776 |
| 7,451,602 B2 | * | 11/2008 | Marakovits et al. | 60/775 |

* cited by examiner

*Primary Examiner* — Michael Cuff
*Assistant Examiner* — Vikansha S Dwivedi
(74) *Attorney, Agent, or Firm* — Edward J. Smith; Ernest G. Cusick; Frank A. Landgraff (57) ABSTRACT

A method is provided for performing a transfer from gas fuel operation to liquid fuel operation in a gas turbine with a dual fuel system. The method includes initiating a predetermined uncontrolled liquid fuel prefill flow rate through the liquid fuel system, sensing an onset of the uncontrolled liquid fuel flow to the combustor nozzles, and initiating transfer from gas fuel operation to liquid fuel operation when the flow of uncontrolled liquid fuel at the combustor nozzles is sensed. The onset of uncontrolled liquid fuel flow to the combustor nozzles is determined by monitoring changes of Fuel Normalized Power (FNP), a parameter sensitive to uncontrolled liquid fuel flow, and determining when FNP exceeds a threshold algorithm value.

12 Claims, 12 Drawing Sheets

METHOD FOR DETECTING ONSET OF UNCONTROLLED FUEL IN A GAS TURBINE COMBUSTOR

BACKGROUND OF THE INVENTION

The invention relates generally to a method for gas turbine control and more specifically to a method for detecting the onset of liquid fuel in a gas turbine combustor to permit control of the gas turbine during a transfer from operation with a gas fuel to operation with a liquid fuel.

Industrial gas turbines are often capable of alternatively running on liquid and gaseous fuels, e.g., natural gas. These gas turbines have fuel supply systems for both liquid and gas fuels. The gas turbines generally do not burn both gas and liquid fuels at the same time. Rather, when the gas turbine burns liquid fuel, the gas fuel supply is turned off. Similarly, when the gas turbine burns gaseous fuel, the liquid fuel supply is turned off. Fuel transfers occur during the operation of the gas turbine as the fuel supply is switched from liquid fuel to gaseous fuel, and vice versa.

Gas turbines that burn both liquid and gaseous fuel require a liquid fuel purge system to clear the fuel nozzles in the combustors of liquid fuel. The liquid fuel supply system is generally turned off when a gas turbine operates on gaseous fuel. When the liquid fuel system is turned off, the purge system operates to flush out any remaining liquid fuel from the nozzles of the combustor and provide continuous cooling airflow to the nozzles.

Figure 1:
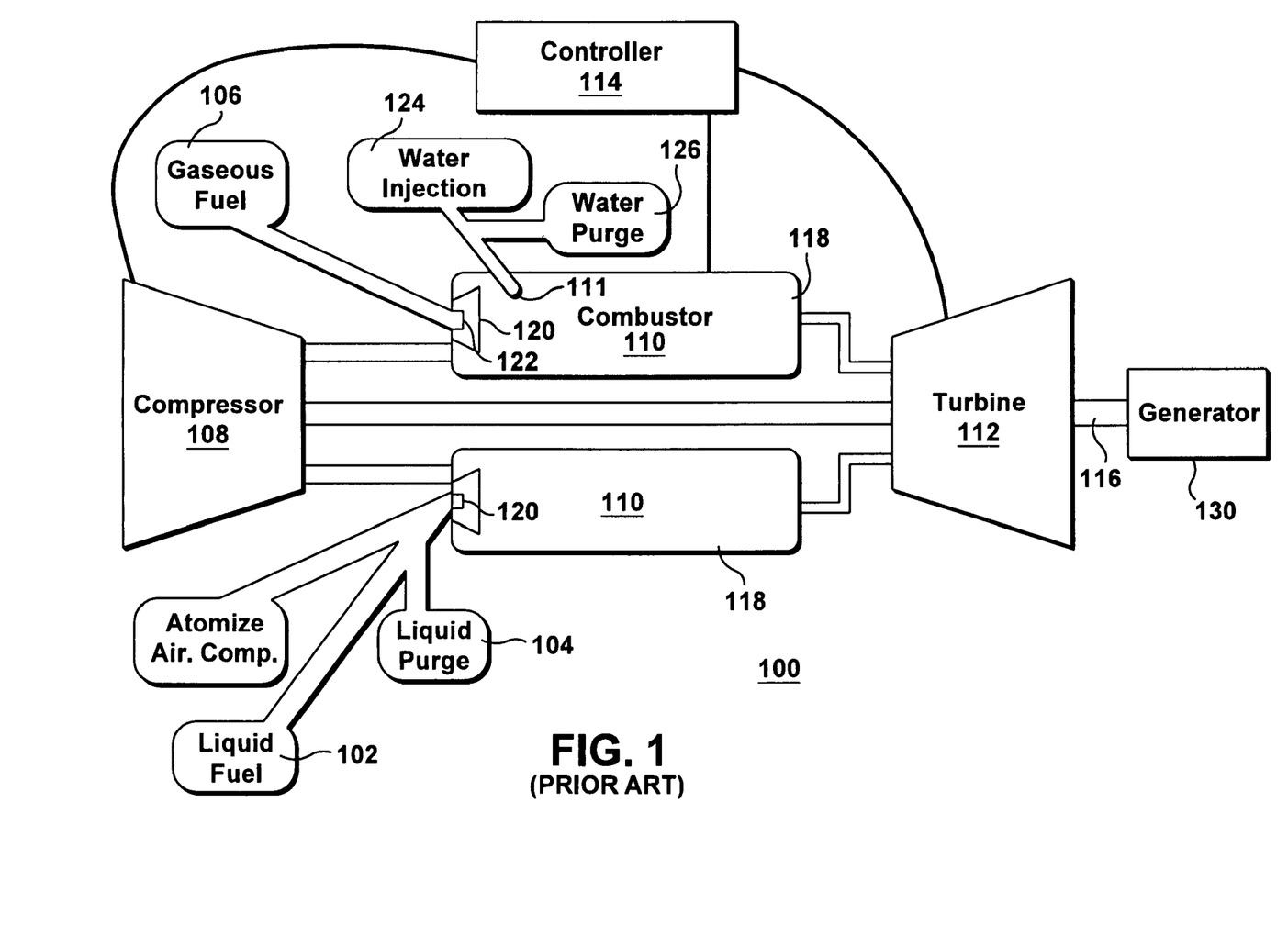
FIG. 1 is a simplified schematic diagram of an exemplary gas turbine having liquid and gas fuel systems.

FIG. 1 is a simplified schematic diagram of an exemplary gas turbine having liquid and gas fuel systems. FIG. 1 shows schematically a gas turbine 100 having liquid fuel system 102 and a liquid fuel purge system 104. The gas turbine is also capable of running on a gas, such as natural gas, and includes a gaseous fuel system 106. Other major components of the gas turbine include a main compressor 108, a combustor 110, a turbine 112 and a controller 114. The power output of the gas turbine 112 is a rotating turbine shaft 116, which may be coupled to a generator 130 that produces electric power.

In the exemplary industrial gas turbine shown, the combustor may be an annular array of combustion chambers, i.e., cans 118, each of which has a liquid fuel nozzle 120 and a gas fuel nozzle 122. The combustor may alternatively be an annular chamber. Combustion is initiated within the combustion cans at points slightly downstream of the nozzles. Air from the compressor 108 flows around and through the combustion cans 118 to provide oxygen for combustion. Moreover, water injection nozzles 124 are arranged within the combustor 110 to add energy to the hot combustion gases and to cool the combustion cans 118.

The air for the liquid fuel system purge may be provided from the compressor 108, boosted by a purge air compressor (not shown) and controlled by other elements of the system (not shown). When the gas turbine 100 operates on natural gas (or other gaseous fuel), the liquid fuel purge system 104 blows compressed air into the liquid fuel system 102 through the liquid fuel nozzles 120 of the liquid fuel 102 system to purge liquid fuel and provide a flow of continuous cooling air to the liquid fuel nozzles 120.

Figure 2:
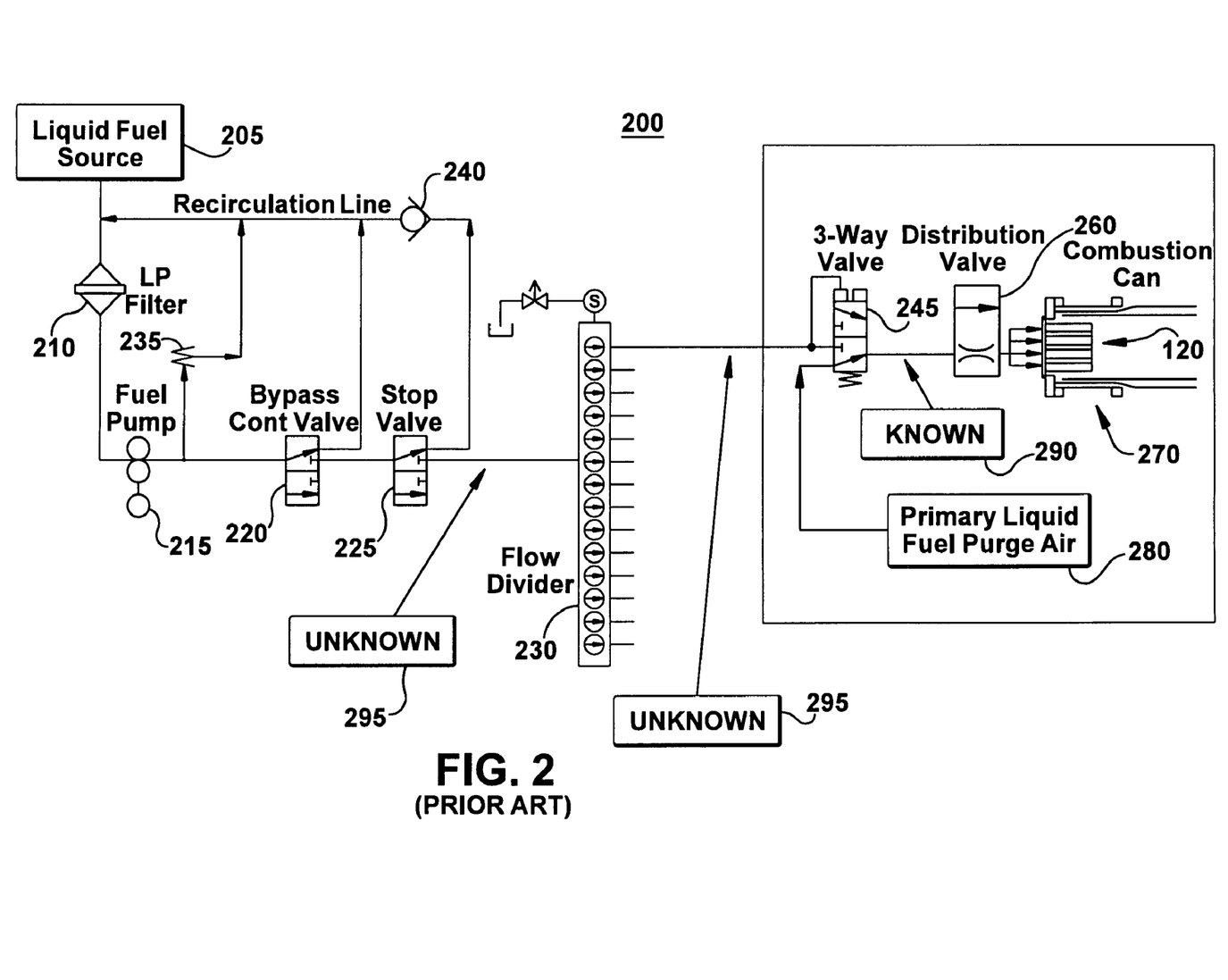
FIG. 2 is a simplified diagram of a gas turbine engine with an existing liquid fuel system.

FIG. 2 is a simplified diagram of a gas turbine engine with an existing liquid fuel system. Liquid fuel is provided to the liquid fuel system 200 from a liquid fuel source 205. The liquid fuel system 200 includes a flowpath to a flow divider 230 through a low pressure filter 210, a fuel pump 215, a bypass control valve 220, and a stop valve 225. Pressure relief valve 235, bypass control valve 220 and stop valve 225 may recirculate liquid fuel flow through recirculation line 240 to the upstream side of the low pressure filter 210. The flow divider 230 divides liquid fuel flow into a plurality of liquid fuel flow paths leading to individual combustion cans 270. Each liquid fuel flow path downstream of the flow divider includes a 3-way (endcover) valve 245 and a distribution valve 260 before entering the combustion can 270.

Three-way valve 245 permits flow to the combustion can nozzles from the liquid fuel flow path (described above) or from a liquid fuel purge air system 280. Three-way valve 245 is designed to selectably allow flow to the combustor nozzles 120 from the liquid fuel while preventing backflow of fuel to the liquid fuel purge air system or to allow purge air to the combustor nozzles 120 while preventing backflow of purge air into the liquid fuel system upstream of the three-way valve. By preventing purge air from entering the liquid fuel system, the air-fuel interfaces with the fuel supply are minimized.

When gas fuel is supplying the turbine, the 3-way valve 245 is positioned to block liquid fuel flow and allow purge air to pass for cooling the fuel nozzles in the combustor. This purge must be shut off when liquid fuel is turned on. The discussion that follows describes a current generation fuel system, which uses a 3-way (endcover) isolation valve (Traver et al., U.S. Pat. No. 6,438,963) to separate the purge air from the liquid fuel. The invention does not require this hardware; the use of 2 check valves, or 2 way on/off valves could be employed.

During a transfer from one fuel source to another, it is desired that continuity of turbine output power be maintained while minimizing any undershoots or overshoots of output power and temperature. In a transfer from operation with a gas fuel to operation with a liquid fuel, the 3-way valve 245 is switched to the liquid fuel line, the stop valve is opened, and the control valve is commanded to some small "prefill" flow. As the liquid fuel line is prefilled, the gas fuel is held at a required demand reference for the generator output output. The liquid fuel must refill the piping, which was previously filled with purge air, before liquid fuel reaches the combustor nozzles 120.

The piping between the 3-way valve 245 and the combustion can 270 has a known volume that is always filled with purge air before a liquid fuel transfer. The known volume 290 is kept small to minimize the affect of purge introduction (causing a load spike). Leakage of air into the system will occur over time. The rate of air leakage into the system is dependent on a number of variable factors, which cannot be controlled or predicted. This results in the piping upstream of the 3-way valve 245 being filled with some volume of air, dependent mostly on the time since the last fuel transfer. While the physical volume of piping is known, the amount filled with air is unknown. Since the volume of the piping upstream is also much greater than the volume downstream of it, an unknown and potentially substantial volume 295 of air must be displaced with prefill liquid fuel before the liquid fuel reaches the combustors 270.

The foregoing factors may cause poor reliability of gas to liquid fuel transfers, including power overshoots and undershoots and sometimes dropped load. Preventive maintenance procedures for the liquid fuel system require transferring to liquid fuel operation periodically to exercise the system. Difficulty with the transfers may discourage operators from carrying out the transfers necessary for exercising the liquid fuel system, exacerbating the reliability problems of the system.

Historically, liquid fuel prefill has been controlled with only the flow measurement feedback, using an open loop setting (not closed on any global parameter). Upon selection of liquid fuel, the bypass control valve 220 is controlled to a nominal value to reach a target prefill flowrate and held there for a specified period (delay time) before the fuel control is ramped up to the full load reference. The prefill has seen changes over the years to deal with a number of issues in addition to the basic goal of prefilling the fuel system. At one time, the prefill flowrate was set to a very low value (approximately 2%) for an extended period of time, typically 30 seconds. Later, the prefill period was increased to 60 seconds and 120 seconds in some cases. The extension of the prefill period was done to have confidence that the liquid fuel lines would be prefilled, and at the same time not to introduce too much "uncontrolled fuel" through use of the open loop setpoint.

Controlled fuel is fuel that is provided to the combustors in response to a fuel reference demand for a given power output. Uncontrolled fuel is fuel that is introduced to the combustors, but which is not recognized in the turbine control fuel demand signals. Liquid fuel prefill is not included in the fuel demand calculation to avoid a detrimental dip in load if the liquid fuel prefill does not reach the combustors as expected, thus creating an under-fueled condition. The side effects of the uncontrolled fuel reaching the combustors is to supply additional energy resulting in an initial load and temperature spike and then causing global fuel demand to be driven down over time to hold the same load output.

The extended prefill period (60 seconds to 120 seconds) was used to ensure complete prefill of the liquid fuel lines, in the face of uncertainty about the unknown amount of air in the system. The current control is only an estimate to ensure the presence of liquid fuel, because the volume to be filled is an unknown that can vary with many factors.

Figure 3:
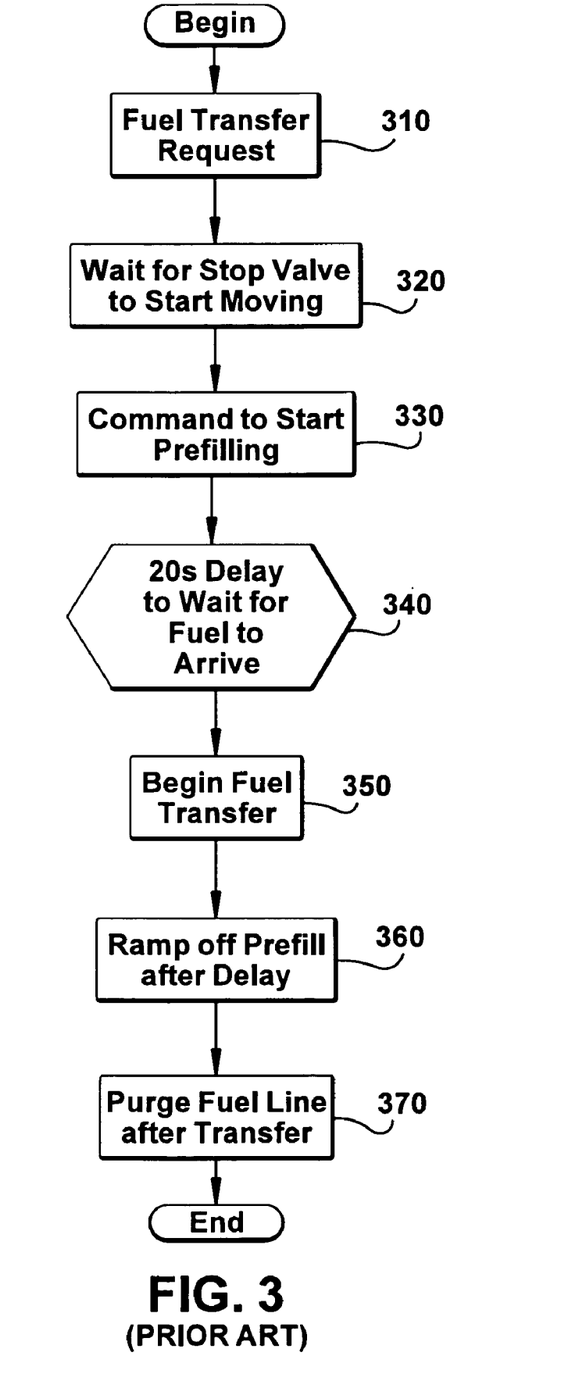
FIG. 3 illustrates an existing timer based algorithm for control of a transfer from gas fuel to liquid fuel.

FIG. 3 illustrates an existing timer based algorithm for control of a transfer from gas fuel to liquid fuel. In step 310 a fuel transfer request is initiated, in which the stop valve in the liquid fuel system is commanded to open to a prefill position. The system waits for the stop valve to start moving in step 320 before a command is issued in step 330 for prefilling to commence. In this existing algorithm, a fixed time delay, shown at an exemplary value of 20 seconds is initiated in step 340. The fixed 20 second time delay is provided to allow the liquid fuel lines to prefill and fuel to reach the nozzles. When the fixed time delay has expired, the fuel transfer between the gas fuel and the liquid fuel is initiated in step 350. After the time delay of step 340 has expired, the liquid fuel prefill (uncontrolled fuel) is ramped off in step 360. Finally, the gas fuel line is purged with air in step 370.

Figure 4:
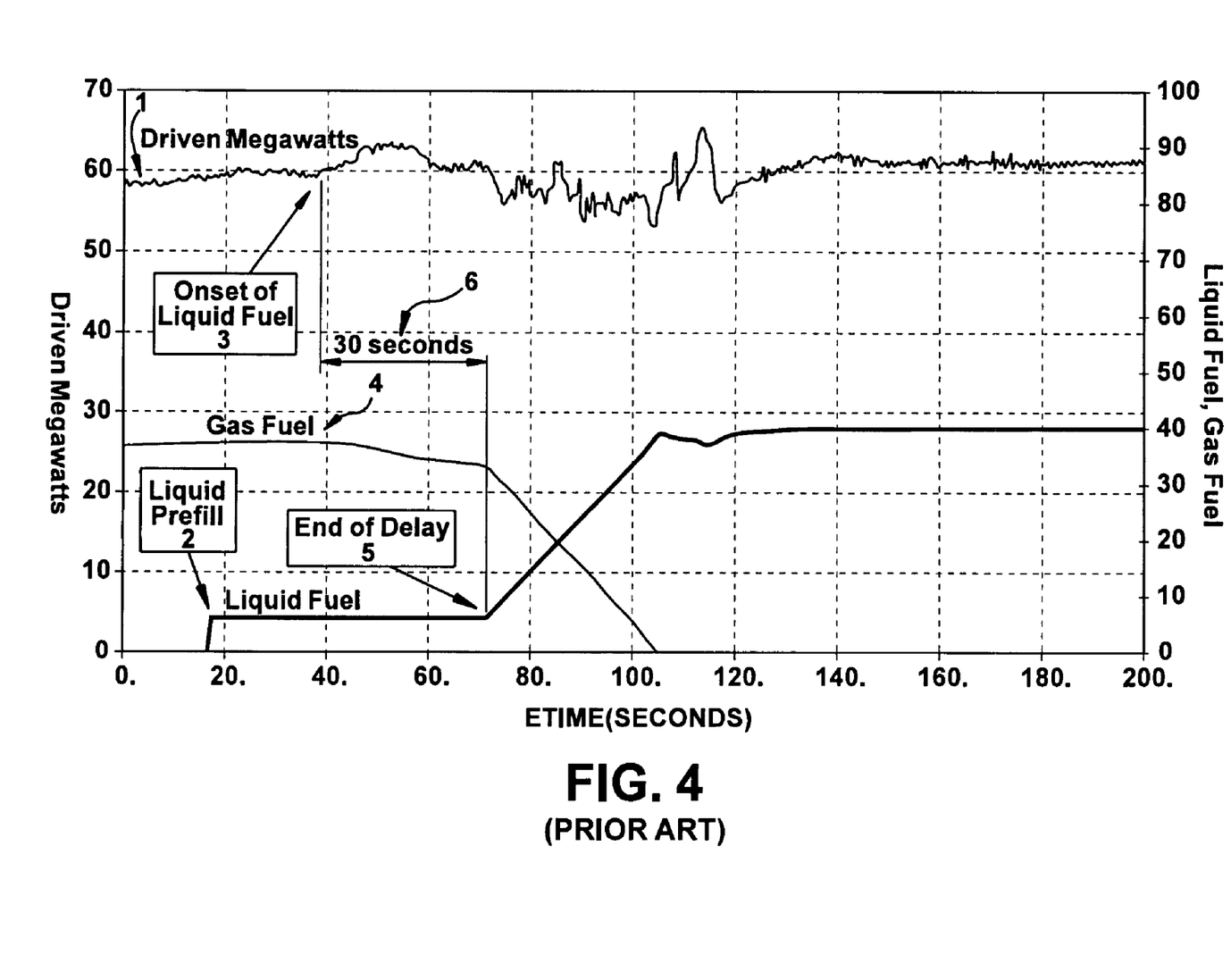
FIG. 4 illustrates response of power output (driven megawatts) of a gas turbine to an over-prefill of liquid fuel due to the prefill delay period being too long.

FIG. 4 illustrates, in curve 1, the response of power output (driven megawatts output at the generator) of a gas turbine to an over-prefill of liquid fuel due to the prefill delay period being too long. Initially, gas fuel is being provided to deliver about 58 driven megawatts. At about 18 seconds, a liquid fuel prefill at 2 is commenced. At about 38 seconds, the driven megawatts begins to rise at 3 in response to the prefill liquid fuel (uncontrolled fuel) reaching the combustors, adding to the energy beyond that called for by global demand to maintain the 58 driven megawatts. Starting at about 40 seconds, the global demand for the gas fuel is slightly reduced at 4 due to the incremental energy being supplied by the uncontrolled liquid prefill fuel. At the end of the prefill delay period at 5, the fuel switchover occurs with the gas fuel being supplied ramped off and the controlled liquid fuel being ramped up. The prefill, in this case, extends about 30 seconds at 6 beyond the onset of liquid fuel at 3.

If the delay is set too long, as occurs in FIG. 4, the system will be running with uncontrolled fuel. In addition, for a low prefill value of approximately 1%-2%, the errors in the system would not be a guarantee of repeatable prefills, which drove the longer prefill periods. For emergency transfer conditions where the gas fuel is being lost and switching to liquid fuel must be done quickly, many failed transfers may occur.

Figure 5:
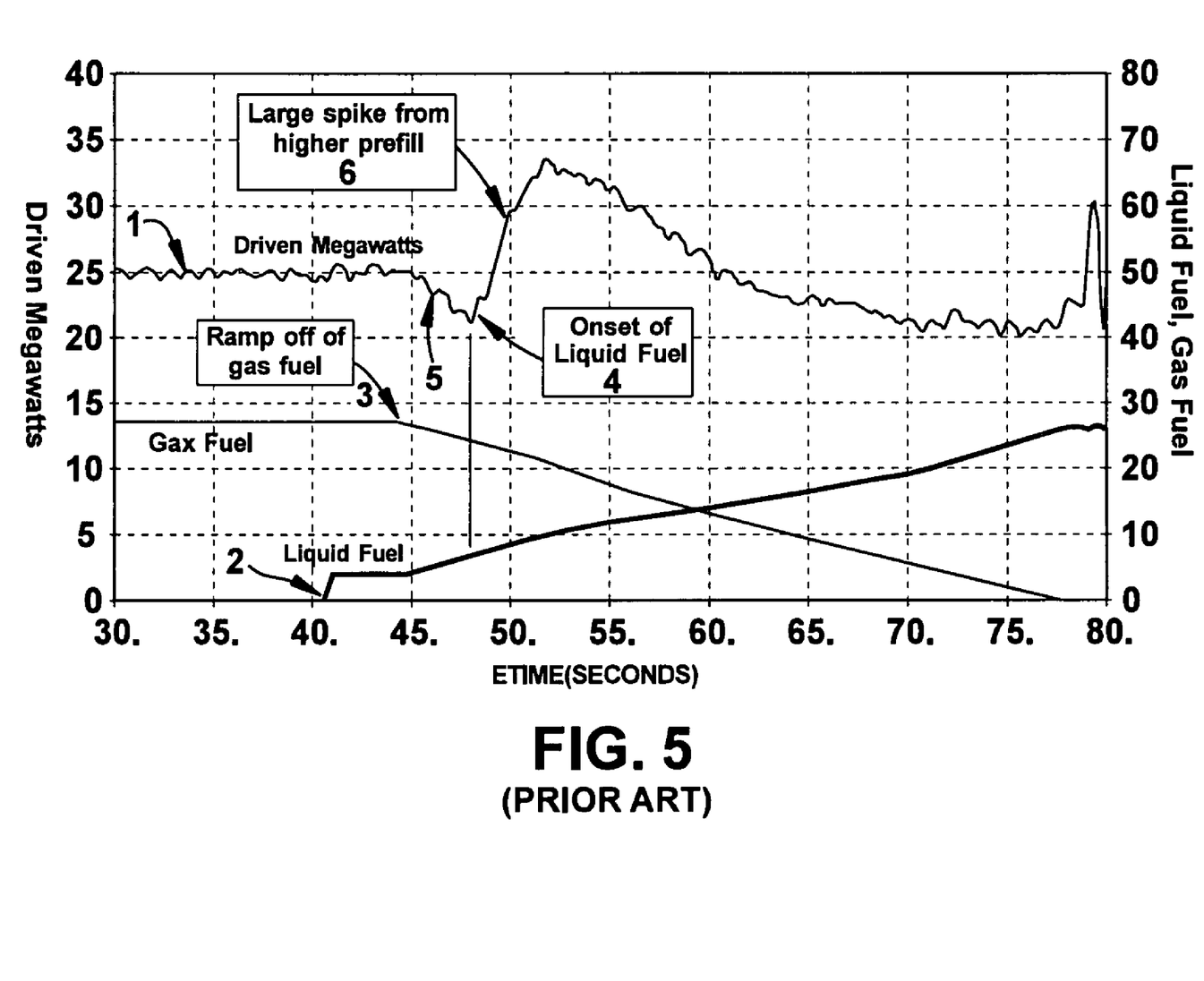
FIG. 5 illustrates response of power output (driven megawatts) of a gas turbine to an under-prefill of liquid fuel due to the prefill delay period being too short.

FIG. 5 illustrates, in curve 1, response of power output (driven megawatts) of a gas turbine to an under-prefill of liquid fuel due to the prefill delay period being too short. Prefilling begins at 2 (about 41 seconds). When the prefill delay period is set too short, the system will start ramping gas fuel off before the arrival of liquid fuel at the combustors. Initially, gas fuel is being provided to deliver about 25 driven megawatts. At about 44 seconds, a fuel switchover at 3 commences with a ramp-off of the gas fuel and a ramp-on of the liquid fuel supply. The 4 second prefill is not sufficient to fill the liquid fuel line, so actual delivery onset 4 of liquid fuel to the combustors does not begin until about 48 seconds. Between 44 and 48 seconds (at 5) the combustor is undersupplied, leading to a drop-off of driven megawatts to about 21. At 48 seconds with the onset of liquid fuel delivery at 4 to the combustor nozzles at a higher ramped rate, a power spike at 6 to about 33 driven megawatts results.

Under-prefilling has two negative side effects. First there is the potential to flameout if the liquid fuel does not arrive quickly after the ramp-off of the gas fuel. Second, if liquid fuel does arrive in time, the control valve will be ramping up, bringing a larger amount of fuel into the combustion can than desired, which will cause a large spike in generated power, which could trip the unit due to over-temperature protection.

As combustion systems evolved to make use of multiple fuel nozzles in a combustor, the very low prefill values had to be raised to avoid possible damage to the fuel nozzles, this with the need for emergency transfers resulted in much higher prefill levels (approximately 6% to 8%). The potential side effects (over-temperature tripping, load shedding of the global fuel reference) are greatly increased if the prefill times are too long Accordingly, there is a need to provide a method of prefilling liquid fuel system lines that can determine when the fuel lines are prefilled, thereby allowing fuel switchovers with greater reliability and smaller transients.

BRIEF DESCRIPTION OF THE INVENTION

The present invention relates to a method by which a control system can detect the onset of liquid fuel to the combustor during a fuel transfer, thereby increasing the reliability of gas fuel to liquid fuel transfers. It eliminates the uncertainty due to the unknown amount of air in the liquid fuel system, resulting in neither too much nor too little uncontrolled fuel.

Briefly in accordance with one aspect of the present invention, a method is provided for performing a transfer from gas fuel operation to liquid fuel operation in a gas turbine. The method includes initiating a predetermined liquid fuel prefill flow rate to through the liquid fuel system, sensing an onset of uncontrolled liquid fuel flow to the combustor nozzles, and initiating transfer from gas fuel operation to liquid fuel operation when the flow of uncontrolled liquid fuel at the combustor nozzles is sensed.

The step of sensing the onset of uncontrolled liquid fuel flow to the combustor nozzles includes monitoring changes of a Fuel Normalized Power (FNP) power according to the following:

$$FNP = \frac{Power}{Fuelref - (PercentLiq)Fuelref_{FSNL-LIQ} - (1 - PercentLiq)Fuelref_{FSNL-GAS}}$$

where Power represents Driven Megawatts at the output of the generator; Fuelref represents Total Fuel Reference demand supplied to the machine; PercentLiq represents Proportion percent of Liquid Fuel where (1=Total Liquid, 0=Total Gas); $Fuelref_{FSNL-LIQ}$ represents a Fuel Reference required at Full Speed No Load on Liquid Fuel (Constant); and $Fuelref_{FSNL-GAS}$ represents Fuel Reference required at Full Speed No Load on Gas Fuel (Constant).

The monitoring changes of FNP may further include tracking the FNP values; sensing when the liquid fuel stop valve begins to open; determining when the FNP exceeds a threshold value; and determining that liquid fuel prefill is reaching the combustor nozzles when FNP exceeds the threshold value. Tracking the FNP values may incorporate applying a filter to the tracked FNP values, wherein the filtering method incorporates applying a moving average to the tracked values of FNP.

Determining when the FNP exceeds a threshold value may include capturing the FNP value when a liquid fuel stop valve begins to open; setting a minimum FNP as the captured FNP value; establishing the threshold value for FNP as the minimum FNP value plus a predetermined offset; setting the minimum FNP value to the current FNP value when the current FNP value is less than the minimum FNP value; and adjusting the threshold value to a new lower FNP value, until a local minimum FNP value is achieved.

The method for performing a transfer from gas fuel operation to liquid fuel may also include the step of establishing the threshold value for FNP further including setting a predetermined offset value that is large enough not to be masked by a moving filter on FNP values and that is smaller than a transient from a fuel transfer.

According to the method, a prefill timer may be inititated when the liquid fuel prefill flow rate is commenced. The step of initiating a prefill timer may include setting a predetermined maximum prefill time; initiating a fuel transfer when the predetermined maximum prefill time has been reached; and then terminating the prefilling with the uncontrolled liquid fuel.

Additionally, initiating a prefill timer may incorporate setting a predetermined minimum prefill time; and maintaining prefill at least until the predetermined minimum prefill time has been reached. The minimum prefill time may be based on calculating the period necessary to prefill the known volume of piping, between an endcover valve and the combustion nozzles at the predetermined prefill flow rate, and then setting the timer to the calculated period.

According to another aspect of the present invention, a controller for a dual gas and liquid fuel system of a gas turbine is provided. The controller includes an output signal for initiating a predetermined liquid fuel prefill flow rate through the liquid fuel system, an input signal sensing an onset of uncontrolled liquid fuel flow to the combustor nozzles, and an output signal initiating transfer from gas fuel operation to liquid fuel operation when the flow of the uncontrolled liquid fuel at the combustor nozzles is sensed.

Another aspect of the present invention provides a gas turbine including a gas and liquid dual fuel system with an air purge system; a liquid fuel stop valve; a liquid fuel prefill timer, including a predetermined minimum prefill time and a predetermined maximum prefill time; and a controller including an input signal sensing an onset of uncontrolled liquid fuel flow to the combustor nozzles further including Fuel Normalized Power (FNP) according to:

$$FNP = \frac{Power}{Fuelref - (PercentLiq)Fuelref_{FSNL-LIQ} - (1 - PercentLiq)Fuelref_{FSNL-GAS}}$$

where Power represents Driven Megawatts at the output of the generator; Fuelref represents Total Fuel Reference demand supplied to the machine; PercentLiq represents Proportion percent of Liquid Fuel where (1=Total Liquid, 0=Total Gas); $Fuelref_{FSNL-LIQ}$ represents Fuel Reference required at Full Speed No Load on Liquid Fuel (Constant); and $Fuelref_{FSNL-GAS}$ represents Fuel Reference required at Full Speed No Load on Gas Fuel (Constant). The controller also incorporates a sensor signal for sensing when the liquid fuel stop valve begins to open; and an algorithm for determining when the FNP exceeds a threshold value; and determining that the uncontrolled liquid fuel prefill is reaching the combustor nozzles when FNP exceeds the threshold value.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 12:
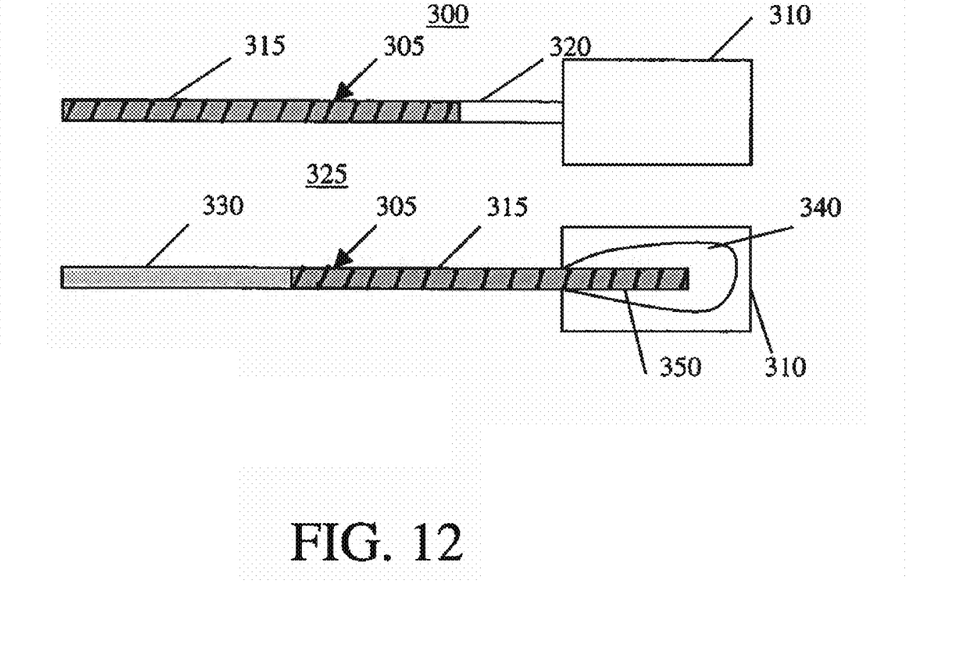
FIG. 12 further illustrates the previously described effect of uncontrolled liquid fuel flow to the combustors of a gas turbine for a transfer from a gas fuel to a liquid fuel.

The following embodiments of the present invention have many advantages, including a method for prefilling liquid fuel system lines that can determine when the fuel lines are prefilled, thereby allowing fuel switchovers with greater reliability and smaller transients. Uncontrolled fuel is the fuel introduced into combustors, but which is not recognized by fuel demand signals of the turbine control system as fuel being supplied to the combustors. FIG. 12 further illustrates the previously described effect of uncontrolled liquid fuel flow to the combustors of a gas turbine for a transfer from a gas fuel to a liquid fuel. Ina prefill state 300 prior to the fuel transfer, liquid fuel piping 305 to the combustor 310 of the gas turbine is partially filled with liquid fuel 315 and partially filled with air 320, but the respective volumes are not precisely known. A prefill operation 325 according to prior methods may supply a liquid fuel volume 325 in an attempt to prefill the liquid fuel piping 305 before the gas turbine controller initiates the transfer operation from the gas fuel to the liquid fuel. If the liquid fuel prefill volume 330 is greater than the liquid fuel piping volume not filled with liquid fuel, some of the liquid fuel 350 flows into the combustors, resulting in additional power 340 produced in the combustor 310 that is not anticipated by the turbine control system, since the control system believes it has provided only the amount of liquid fuel necessary to prefill the liquid fuel lines. The liquid fuel that enters the combustors but is not recognized by the control system as being supplied to the combustors, is the uncontrolled liquid fuel flow 350.

The object of the invention is to increase the reliability of transfers from gas fuel to liquid fuel in a gas turbine engine by a controller of the gas turbine control system monitoring additional feedback signals to determine the point in time at which uncontrolled liquid fuel reaches the combustor nozzles during a prefill by the effect on produced turbine power. To this end, Fuel Normalized Power (FNP) is a very useful signal, in that it is not affected by changes in the global fuel demand (changing load request) and has a much faster transport delay than alternative signals, such as temperature. Monitoring changes in FNP can permit detecting, with confidence, the onset of uncontrolled fuel.

The first step in detection of uncontrolled fuel is to differentiate it from controlled fuel by using a signal that leaves uncontrolled fuel as the dominant factor. An increase in turbine output power is a net result of supplying uncontrolled fuel to the combustors, but the fuel reference demand signal supplied by the controller is a more dominant factor. Fuel Normalized Power (FNP) is power normalized to the current fuel reference, less the amount to hold speed at no power, as calculated below in Equation 1:

$$FNP = \frac{Power}{Fuelref - (PercentLiq)Fuelref_{FSNL-LIQ} - (1 - PercentLiq)Fuelref_{FSNL-GAS}}, \quad \text{(Equation 1)}$$

where Power is represented in Driven Megawatts at the output of the generator; Fuelref represents Total Fuel Reference demand supplied to the machine; PercentLiq represents Proportion percent of Liquid Fuel where (1=Total Liquid, 0=Total Gas); $Fuelref_{FSNL-LIQ}$ represents a Fuel Reference required at Full Speed No Load on Liquid Fuel (Constant); and $Fuelref_{FSNL-GAS}$ represents a Fuel Reference required at Full Speed No Load on Gas Fuel (Constant).

Driven watts (feedback) and fuel stroke reference (fuel demand) are measured with two different signal types, each with its own inherent noise. There is also a lag between the fuel demand and the actual power produced (typically fuel transport lag). Dividing one noisy signal by another with uncorrelated noise can easily lead to compounded noise in the resulting signal. To alleviate the noise issue, the signal needs to be filtered.

Figure 6:
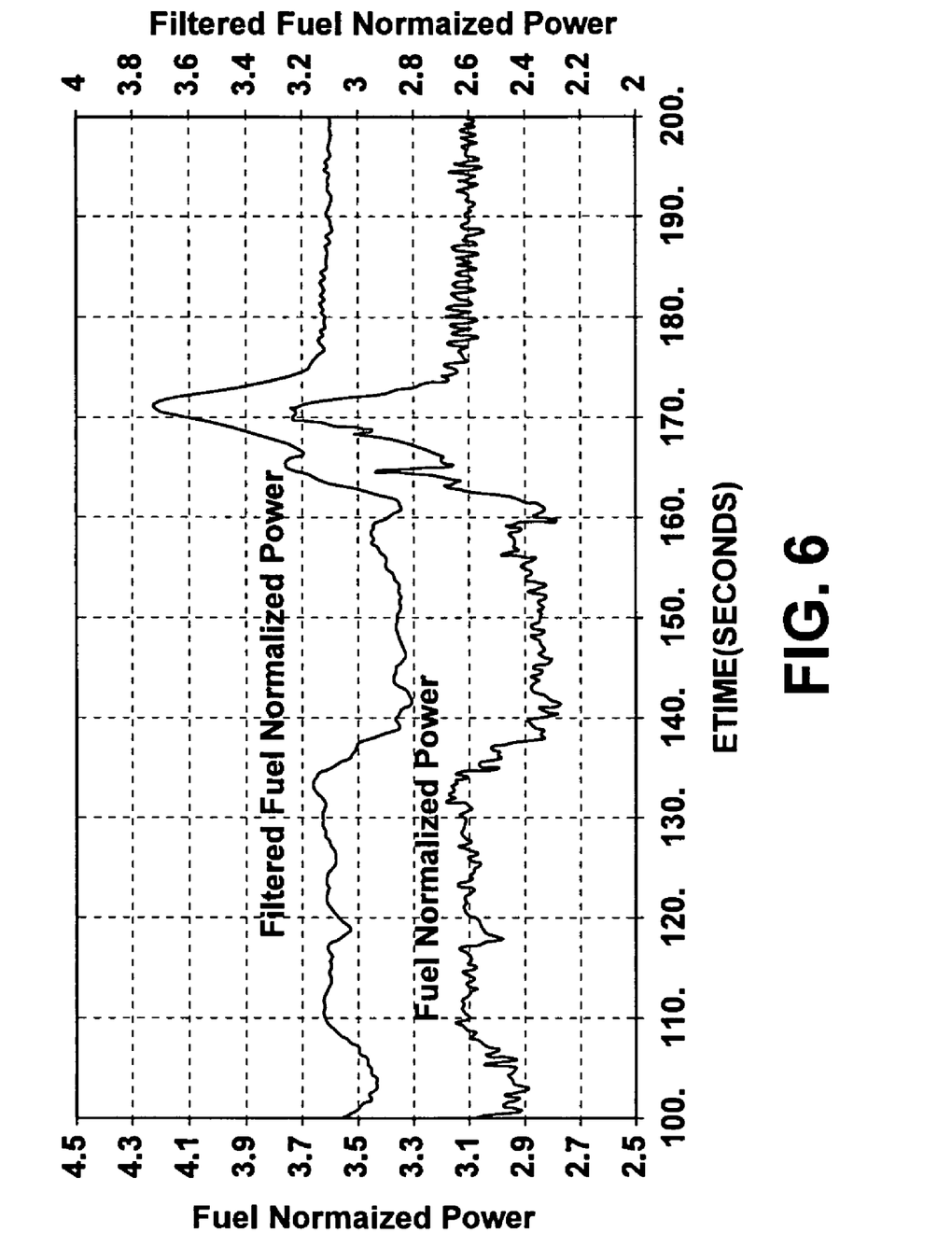
FIG. 6 illustrates an example of a noisy FNP signal and a filtered FNP signal.

FIG. 6 illustrates an example of a response of noisy FNP signal and a filtered FNP signal to a fuel transfer. The selection of a filter frequency was based on the investigation of site data and balancing acceptable noise against the lag imposed by filtering. The implementation described here uses a 2.5 Hz moving average. This selection injects about half a second of lag into the signal, but brings the noise to a level that can be accounted for in conjunction with use in a threshold algorithm.

Figure 7:
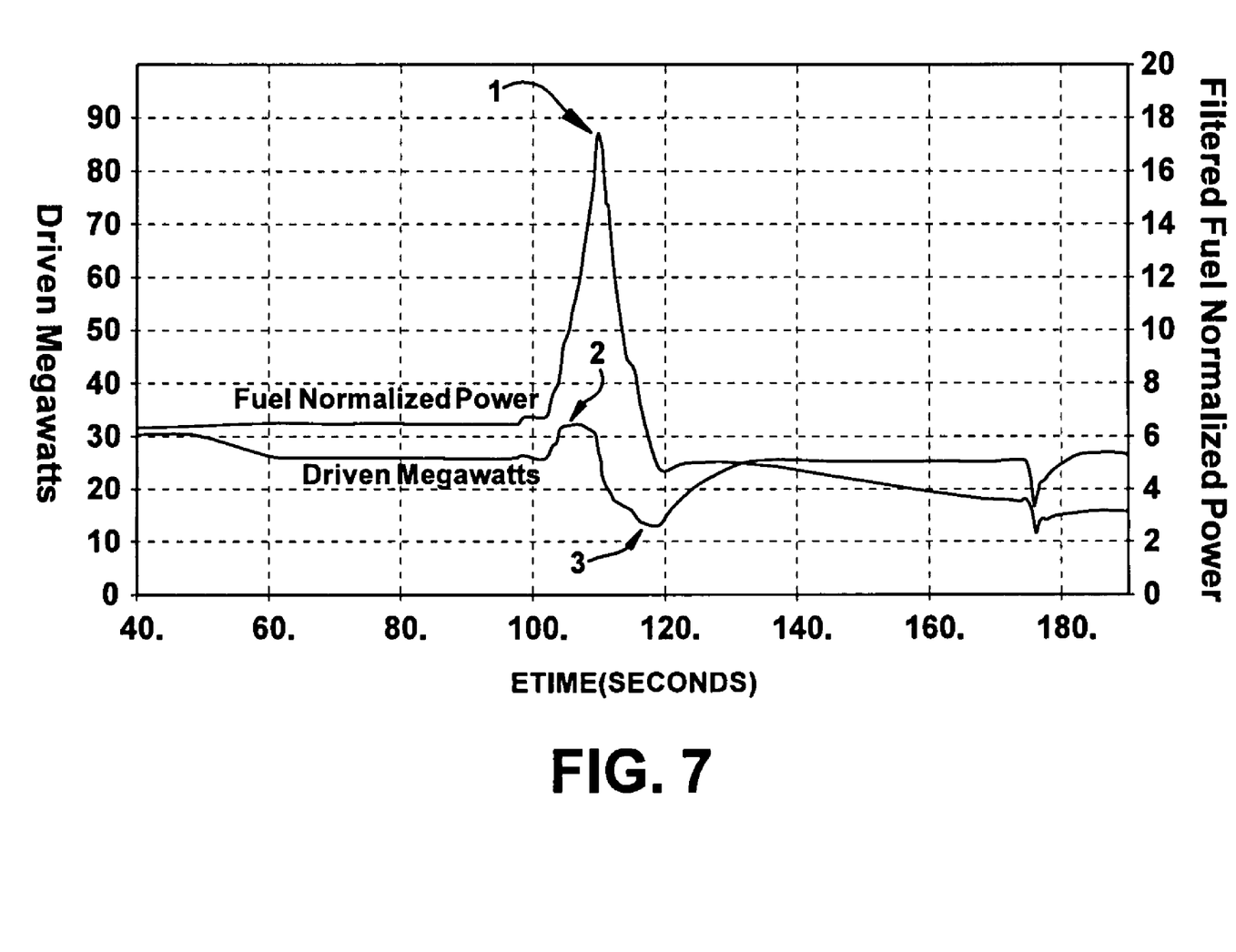
FIG. 7 is a graph illustrating the relative response, in a computer simulation of the Driven Megawatts parameter and Fuel Normalized Power parameters to a fuel transfer.

FIG. 7 is a graph illustrating the relative response, in a computer simulation of the Driven Megawatts parameter and Fuel Normalized Power parameter to a fuel transfer. The left vertical axis of the graph displays units of Driven Megawatts and the right vertical axis displays units of Fuel Normalized Power. The sharp peak at 1 in Fuel Normalized Power between 100 seconds and 120 seconds illustrates the superior detection capability of this parameter to sense power change due to uncontrolled fuel, when compared with the smaller relative response of Driven Megawatts with a peak at 2 and an undershoot at 3.

Because the FNP parameter can accentuate changes in power due to uncontrolled fuel, it is applied in an algorithm to determine when power is being produced from uncontrolled fuel entering the combustor nozzles, indicating thereby that the liquid fuel lines are filled and that the fuel transfer may proceed. It was desired to establish a threshold value for a change in the FNP parameter that would indicate the fuel was reaching the nozzles.

To be effective, the inventive algorithm must discriminate between changes in FNP caused by uncontrolled fuel reaching the nozzles and FNP increases caused by other factors. For example, when transferring to liquid fuel at high load, the unit is required to first transfer between gaseous combustion modes. This transfer between gaseous combustion modes has a transient effect on the FNP very similar to the effect seen from liquid fuel reaching the nozzle. Any such transients that occur before the liquid fuel stop valves initiates liquid fuel flow cannot be associated with the fuel flow to the nozzles. Delaying the inventive algorithm until the liquid stop valve moves mitigates the risk of a false positive based on this transient, however the spillover of this transient into the liquid fuel transient places limits on the threshold algorithm.

A basic threshold method is to capture the value of FNP when the liquid stop valve starts moving, and trigger when the current value exceeds the captured value plus some selected offset. The mode transfer transient spillover places an upper bound on this value, and the amount of relative noise post-filtering at low load places a lower bound on it. At 2.5 Hz filtering, the acceptable value range is very tight. One solution is to use a more aggressive filter, but this weakens the response time of the overall detection algorithm. A better solution is to exploit the nature of the high load transients to significantly push out the upper bound.

Figure 8:
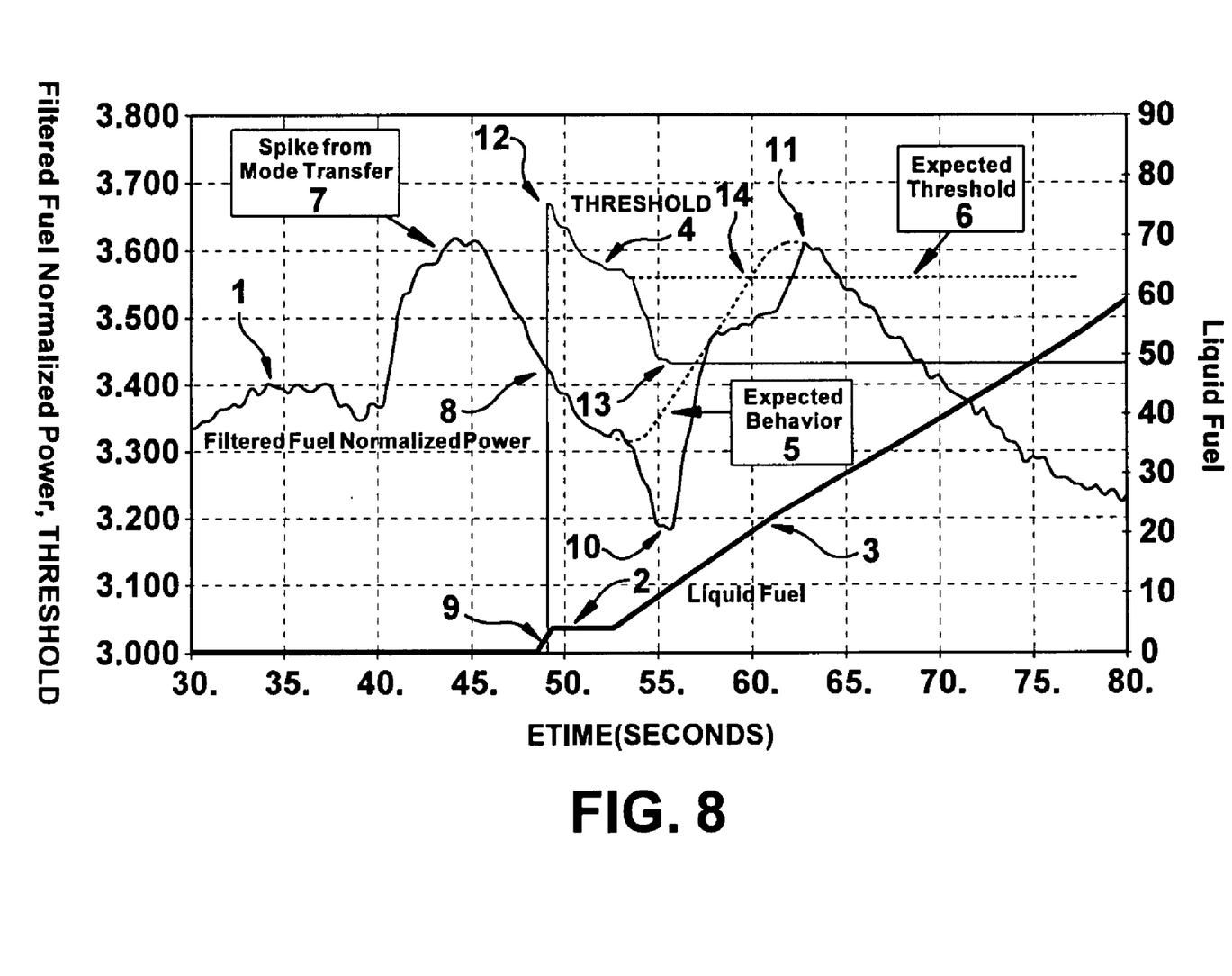
FIG. 8 is an illustration of response of the threshold algorithm to a fuel transfer at high load.
Figure 9:
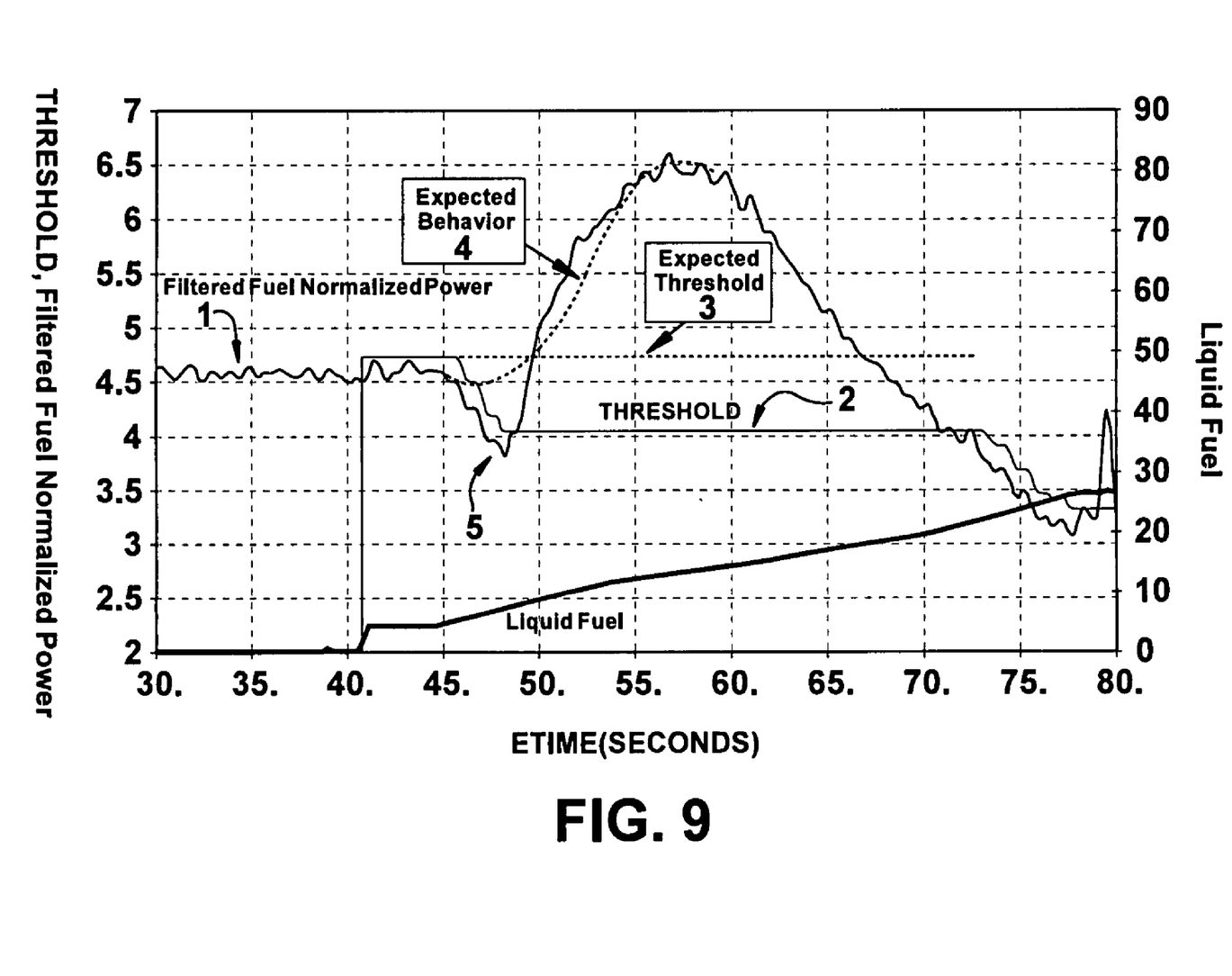
FIG. 9 is an illustration of a response of the threshold algorithm to a fuel transfer at a low load.

FIG. 8 and FIG. 9 illustrate backfit responses of the threshold algorithm to a fuel transfer under the prior art algorithm for transfers with a fixed liquid prefill time delay. The fuel transfers of FIG. 8 and FIG. 9 are at high load and low load, respectively, using site data.

FIG. 8 includes a filtered FNP transient curve 1, a liquid fuel prefill curve 2, and a liquid fuel ramp-up curve 3. A threshold curve 4, based on the filtered FNP curve 1 with an offset of 0.25, is shown with a solid line. Expected behavior of filtered FNP curve 5 and the threshold curve 6, had prefilling proceeded in accordance with the inventive control algorithm, are shown as dashed lines. FIG. 8 reflects a short prefill time leading to an undershoot of FNP at 10 and an overshoot at 11

In FIG. 8, an initial FNP spike at 7 begins (at about 40 seconds) due to a transfer between gaseous combustion modes prior to inception of a gas fuel to liquid fuel transfer. The presence of the FNP spike at 7 is not associated with introduction of the non-controlled liquid fuel. The inventive threshold algorithm captures the initial value at 8 (3.42) of FNP when the liquid fuel stop valve begins opening at 9 (at about 47 seconds), and then continues to track the current value of FNP to find a local minimum for the parameter and hold the lowest value. The threshold algorithm establishes a threshold value set to the current FNP minimum value plus a predetermined offset (0.25) above this local minimum. This threshold setting must be small enough to be satisfied during the transient that results from the fuel transfer. The initial threshold value at 12 is about 3.67. The threshold value changes until a local minimum is reached for FNP at 10, thereby establishing the final threshold value at 13 (about 3.42). This approach allows for a larger gap between the upper and lower bound and thus enables faster response due to a less aggressive filtering method. Dashed line 5 represents backfit data showing the expected FNP transient that would have resulted had control under the inventive threshold algorithm been utilized. Dashed line 6 represents backfit data showing the expected threshold values that would have resulted from use of the inventive algorithm. Use of the threshold algorithm would have maintained prefilling longer (until 60 seconds at 14) resulting in a smaller FNP undershoot FIG. 9 depicts similar backfit responses using the inventive threshold algorithm with a 0.25 offset during a fuel transfer at low load with an under-prefill. Actual response to the transfer for filtered FNP is shown in curve 1 and for threshold values in curve 2. Backfit data showing the expected response of the threshold value and FNP, had the transfer been made according to the inventive threshold algorithm, are provided as dashed curves 3 and 4, respectively. The expected behavior with the inventive threshold algorithm does not result in an undershoot of filtered FNP, as occurs at 5 with the prior art algorithm.

The liquid fuel system on the combustor side of the 3-way valve is purged with air when not in use. This establishes a known minimum volume that is always empty during a subsequent gas to liquid fuel transfer. This value is used along with the position reference on the valve during prefill to calculate a minimum time within which the piping could possibly fill. The inventive algorithm employs a minimum prefill time for the prefill timer to ensure as a minimum that the piping downstream of the 3-way valve is full to the combustor nozzles. This allows for increased reliability through added protection against under-prefilling, a major cause of transfer related trips. The inventive algorithm also includes a maximum prefill time to avoid confusing the operator in the case of very large volumes to fill with liquid fuel, where the system would appear unresponsive and suddenly transfer several minutes later. Therefore, the transfer from gas to liquid fuel is performed when the maximum prefill timer has elapsed, even if the threshold algorithm has not identified the presence of uncontrolled liquid fuel at the combustors.

Figure 10:
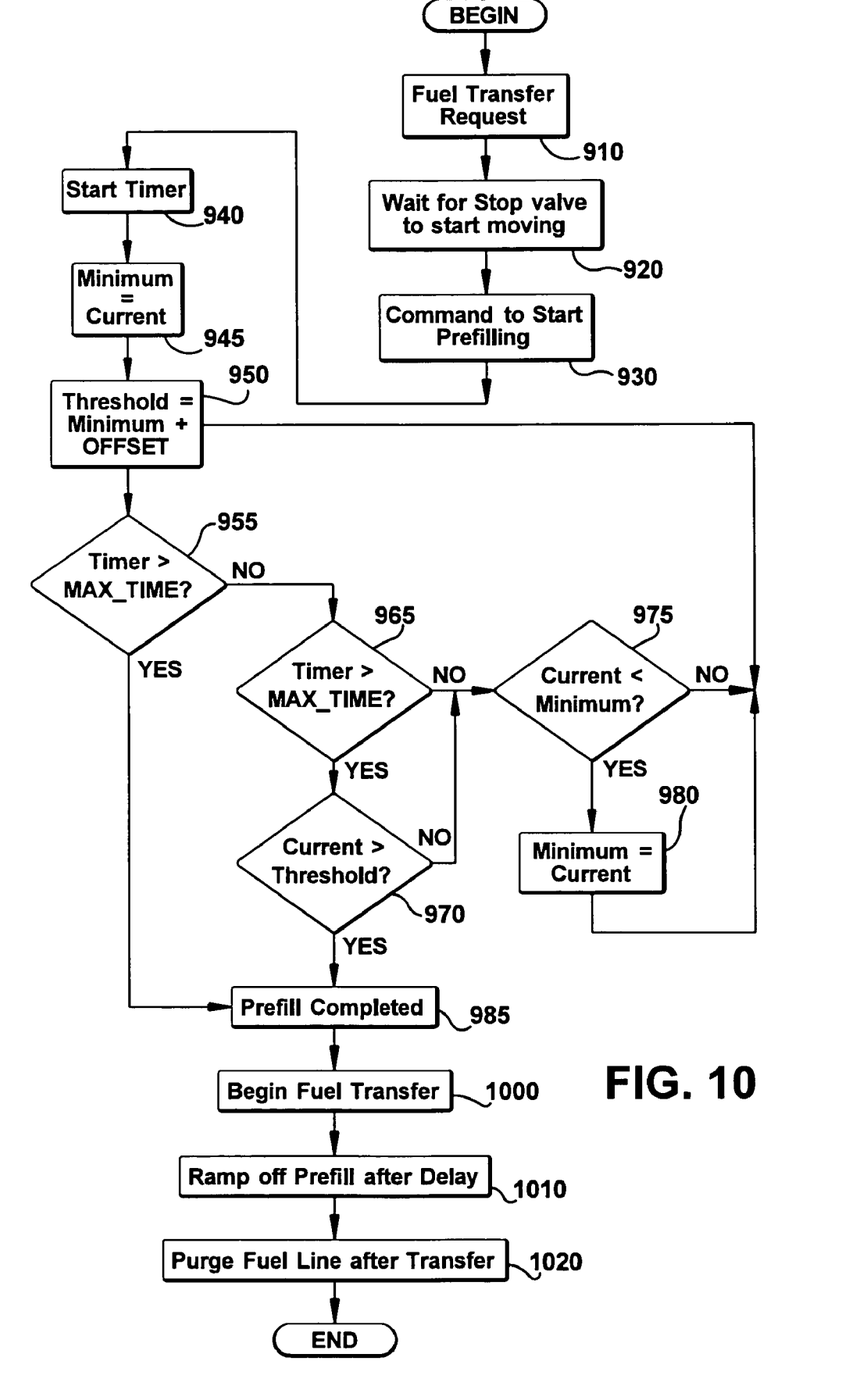
FIG. 10 is a flow chart of a fuel transfer incorporating the inventive threshold algorithm.

FIG. 10 is a flow chart incorporating the inventive threshold algorithm for fuel transfer control. A fuel transfer request is initiated at step 910. Based on the fuel transfer request, opening of the stop valve is initiated with the prefill control waiting for the stop valve opening to be sensed in step 920, before the command to start prefilling is issued in step 930.

In step 940, a prefill timer is initiated. In step 945, the tracking of the current FNP value begins with a parameter MINIMUM (minimum FNP) capturing an initial value for FNP. In step 950, a parameter THRESHOLD is continuously assigned the MINIMUM value plus a predetermined offset value, OFFSET.

In step 955, it is determined if the prefill timer exceeds a predetermined time, MAX_TIME. If MAX_TIME is exceeded, the prefill is complete in step 985. If the prefill timer has not exceeded MAX_TIME in step 955, then the prefill timer is checked in step 965 to determine if a MIN_TIME is exceeded. If MIN_TIME is exceeded, then the current FNP value is tested in step 970 to determine if it is above the THRESHOLD value. Being above the THRESHOLD value in step 970 provides a high probability that the uncontrolled prefill liquid fuel has reached the combustor nozzles, so the prefill is complete per step 985.

Alternatively, if either the prefill timer has not exceeded MIN_TIME in step 965 or if the current FNP value is not above the THRESHOLD value, then the prefill is not complete. Prefilling continues while further testing takes place in step 975 to determine a local minimum for FNP. Subsequent increases in FNP off the local minimum may then be attributed to a change produced by uncontrolled prefill fuel reaching the combustion nozzles. If the current FNP value is above the MINIMUM, then the testing for exceeding the THRESHOLD is repeated in step 950. If instead, the current value for FNP is below the last MINIMUM value, then MINIMUM is assigned the lower value for FNP in step 980 while searching continues for a local minimum value and the THRESHOLD is reset in step 980 to recognize the new MINIMUM. The loop is repeated until prefill is completed in step 985.

When the prefill with the uncontrolled liquid fuel is completed in step 985, the fuel transfer between the gas fuel and the liquid fuel is begun in step 1000. The prefill of the uncontrolled liquid fuel is ramped off in step 1010. When the fuel transfer is complete, the gas fuel line is purged with air in step 1020.

Figure 11:
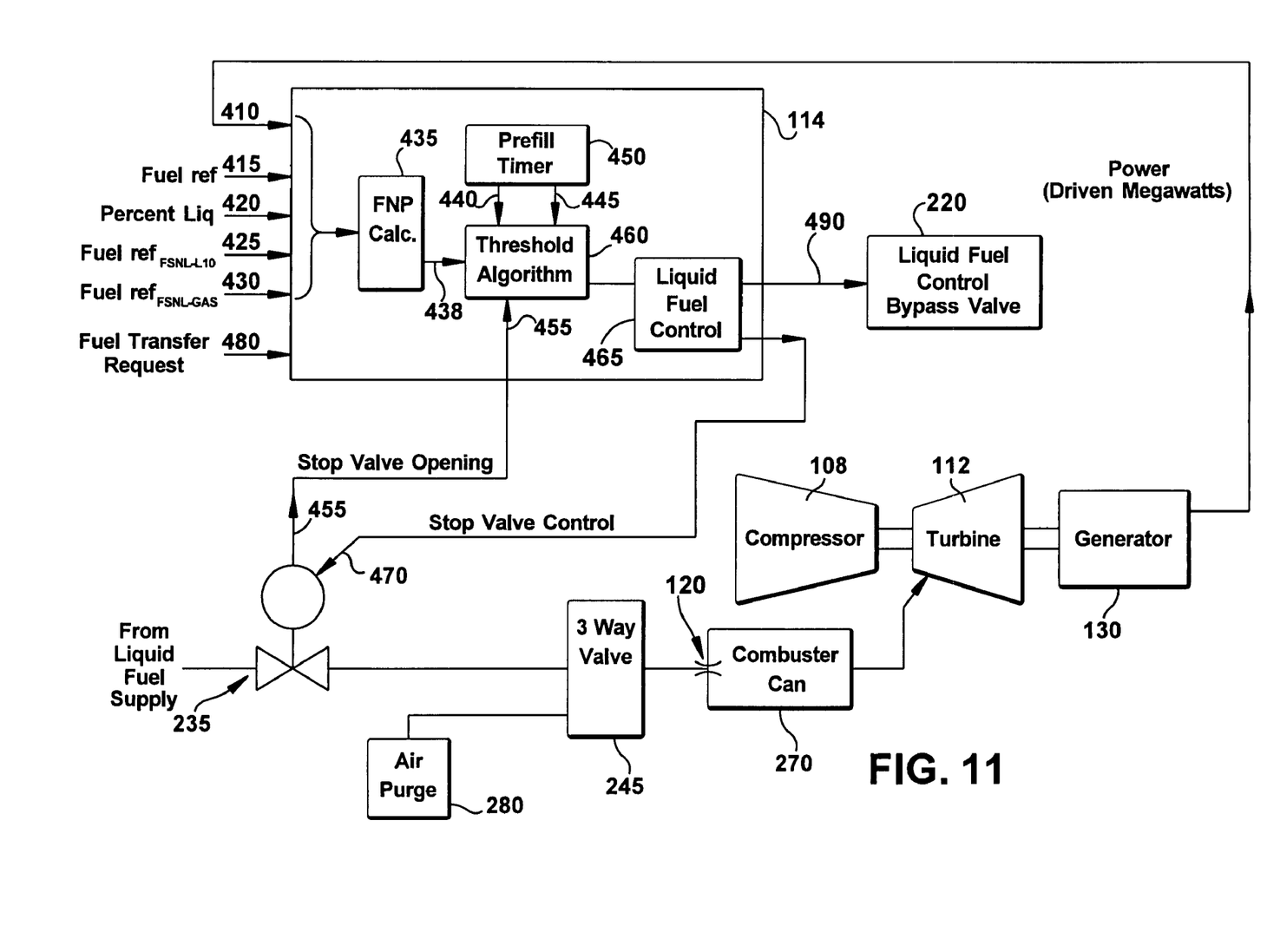
FIG. 11 is a flow chart of control signals provided to the gas turbine controller associated with sensing the onset of uncontrolled fuel during a gas fuel to liquid fuel transfer.

FIG. 11 is a flow chart of control signals provided to the gas turbine controller associated with sensing the onset of uncontrolled fuel during a gas fuel to liquid fuel transfer. FIG. 11 includes a controller 114, a compressor 108, a turbine 112, a generator 130 and elements of the liquid fuel system, such as stop valve 235. The controller 114 receives input signals for Power 410 (representing Driven Megawatts at the output of the generator); Fuelref 415 (representing a Total Fuel Reference demand supplied to the machine); PercentLiq 420 (representing a Proportion percent of Liquid Fuel where (1=Total Liquid, 0=Total Gas); Fuelref$_{FSNL-LIQ}$ 425 (representing Fuel Reference required at Full Speed No Load on Liquid Fuel (Constant)); and Fuelref$_{FSNL-GAS}$ 430 (representing Fuel Reference required at Full Speed No Load on Gas Fuel (Constant)). Using the above input signals, the controller 114 calculates Fuel Normalized Power (FNP) 435 according to Equation 1, as described previously.

The controller 114 also receives a stop valve opening signal 455 from a sensor on the stop valve 235. The FNP parameter 438 is input to threshold algorithm 460. Following a fuel transfer request 480, after the controller receives the stop valve opening signal 455 and after a command to start prefilling has been issued, a prefill timer 450 is initiated. Threshold algorithm 460 also receives inputs from the timer 450 when a predetermined maximum prefill time signal 440 has elapsed and when a predetermined minimum prefill time signal 445 has elapsed. The controller 114 executes the threshold algorithm 460 in accordance with FIG. 10 to determine the onset of uncontrolled liquid fuel to the combustors.

When the onset of uncontrolled liquid fuel to the combustors is sensed in accordance with FIG. 10, the controller 114 begins the fuel transfer from gas fuel to controlled liquid fuel. The fuel transfer includes the ramping on of controlled liquid fuel to the fuel reference level for a demanded output power and ramping off of the uncontrolled liquid fuel prefill. Output signal 490 from a liquid fuel control function 465 controls liquid fuel flowrates through liquid fuel bypass control valve 220 (FIG. 2) according to signal 490. Signal 470 is the output control for the stop valve control 235 in response to fuel transfer request signal 480.

Dual fuel gas turbines have been historically experience problems during gas to liquid fuel transfers. This invention corrects one of the major reliability issues, using a purely software based solution. This software is applicable to all dual fuel gas turbine engines, and offers customers increased confidence in gas to liquid fuel transfers. As a result, improved functionality is provided for both emergency backup transfers and for operation flexibility. Increasing reliability of the liquid fuel system (and by extension, customer confidence in it) is an important step in making liquid fuel and hence dual fuel control more viable options.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for performing a transfer from gas fuel operation to liquid fuel operation for a gas turbine, including a compressor; combustors; a turbine; a turbine control system with a controller; and a gas fuel delivery system and a liquid fuel delivery system arranged to deliver fuel to the combustors wherein during the transfer from gas fuel operation to liquid fuel operation the gas fuel delivery system is purged of air with a liquid fuel prefill flow; and further wherein the prefill liquid fuel flow reaching the combustors is not recognized by the controller in fuel demand signals for the gas turbine control and is termed uncontrolled liquid fuel, the method comprising:

initiating by a controller of a predetermined liquid fuel prefill flow rate through the liquid fuel system for filling of liquid fuel lines with liquid fuel;

sensing by the controller of an onset of uncontrolled liquid fuel flow to combustor nozzles; and initiating by the controller of a transfer from gas fuel operation to liquid fuel operation when the flow of uncontrolled liquid fuel at the combustor nozzles is sensed.

2. The method for performing a transfer from gas fuel operation to liquid fuel operation in a gas turbine according to claim 1, the step of sensing by the controller of the onset of uncontrolled liquid fuel flow to the combustor nozzles comprising:

monitoring by the controller of changes of a Fuel Normalized Power (FNP) according to the following:

$$FNP = \frac{Power}{Fuelref - (PercentLiq)Fuelref_{FSNL-LIQ} - (1 - PercentLiq)Fuelref_{FSNL-GAS}}$$

where Power is represented in Driven Megawatts at the output of the generator; Fuelref represents Total Fuel Reference demand supplied to the machine; PercentLiq represents Proportion percent of Liquid Fuel where (1=Total Liquid, 0=Total Gas); Fuelref$_{FSNL-LIQ}$ represents Fuel Reference required at Full Speed No Load on Liquid Fuel (Constant);

and Fuelref$_{FSNL-GAS}$ represents Fuel Reference required at Full Speed No Load on Gas Fuel (Constant).

3. The method for performing a transfer from gas fuel operation to liquid fuel operation in a gas turbine according to claim 2, the step of monitoring by the controller of changes of FNP comprising:

tracking by the controller of the FNP;

sensing by the controller when the liquid fuel stop valve begins to open;

determining by the controller when the FNP exceeds a threshold value; and determining by the controller that an uncontrolled liquid fuel is reaching the combustor nozzles when FNP exceeds the threshold value.

4. The method for performing a transfer from gas fuel operation to liquid fuel operation in a gas turbine according to claim 3, the step of tracking by the controller of the FNP comprising: applying by the controller of a filter to the tracked FNP.

5. The method for performing a transfer from gas fuel operation to liquid fuel operation in a gas turbine according to claim 4, the step of applying a filter to the measured FNP comprising applying a moving average to the tracked FNP.

6. The method for performing a transfer from gas fuel operation to liquid fuel operation in a gas turbine according to claim 3, the step of determining by the controller when the FNP exceeds a threshold value comprising:

capturing by the controller of the FNP when the liquid fuel stop valve begins to open;

setting by the controller of a minimum FNP as the captured FNP;

establishing by the controller of the threshold value for FNP as the minimum FNP plus a predetermined offset;

setting by the controller of the minimum FNP to the current FNP when the current FNP is less than the minimum FNP; and setting by the controller of the threshold value to a new lower FNP, until a local minimum FNP is achieved.

7. The method for performing a transfer from gas fuel operation to liquid fuel operation in a gas turbine according to claim 6, the step of establishing by the controller of the threshold value for FNP further comprising: setting by the controller of a predetermined offset that is large enough not to be masked by a moving filter on FNP and that is smaller than a transient from a fuel transfer.

8. The method for performing a transfer from gas fuel operation to liquid fuel operation in a gas turbine according to claim 7, the step of initiating by the controller of a prefill timer comprising:

setting by the controller of a predetermined maximum prefill time;

initiating by the controller a fuel transfer when the predetermined maximum prefill time has been reached; and terminating by the controller the prefill with the uncontrolled liquid fuel.

9. The method for performing a transfer from gas fuel operation to liquid fuel operation in a gas turbine according to claim 8, the step of setting by the controller of a predetermined maximum prefill time comprising: providing by the controller a fixed time in which a transfer must occur to prevent unexpected transfer after long prefill times.

10. The method for performing a transfer from gas fuel operation to liquid fuel operation in a gas turbine according to claim 7, the step of setting by the controller of a predetermined minimum prefill time comprising:

calculating by the controller of a period necessary to prefill a known volume of piping, filled with purge air and located upstream of combustor nozzles, at the predetermined prefill flow rate; and     setting by the controller of the predetermined minimum prefill time to the calculated period.

11. The method for performing a transfer from gas fuel operation to liquid fuel operation in a gas turbine according to claim 6, further comprising: initiating by the controller of a prefill timer when an uncontrolled liquid fuel prefill flow rate is initiated.

12. The method for performing a transfer from gas fuel operation to liquid fuel operation in a gas turbine according to claim 11, the step of initiating by the controller of a prefill timer further comprising:

setting by the controller of a predetermined minimum prefill time; and     maintaining by the controller of a prefill at least until the predetermined minimum prefill time has been reached.

\* \* \* \* \*